(12) United States Patent
Posner

(10) Patent No.: US 11,867,218 B2
(45) Date of Patent: Jan. 9, 2024

(54) WORK APPARATUS AND STUD BOLT FOR A WORK APPARATUS

(71) Applicant: Andreas Stihl AG & Co. KG, Waiblingen (DE)

(72) Inventor: Benedikt Posner, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 360 days.

(21) Appl. No.: 16/876,901

(22) Filed: May 18, 2020

(65) Prior Publication Data

US 2020/0370589 A1 Nov. 26, 2020

(30) Foreign Application Priority Data

May 20, 2019 (EP) .................................... 19175471

(51) Int. Cl.
| | |
|---|---|
| *F16B 35/02* | (2006.01) |
| *F16B 35/04* | (2006.01) |
| *B27B 17/02* | (2006.01) |
| *F16B 33/02* | (2006.01) |
| *F16B 35/06* | (2006.01) |

(52) U.S. Cl.
CPC ............ *F16B 35/044* (2013.01); *B27B 17/02* (2013.01); *F16B 33/02* (2013.01); *F16B 35/06* (2013.01)

(58) Field of Classification Search
CPC ........ F16B 33/06; F16B 35/06; F16B 35/044; B27B 17/02
USPC .................................................. 411/107, 389
See application file for complete search history.

(56) References Cited

U.S. PATENT DOCUMENTS

| | | | | |
|---|---|---|---|---|
| 3,245,142 A | * | 4/1966 | Williams | ................ F16B 37/00 411/347 |
| 3,491,630 A | * | 1/1970 | Mielke | .................... F16B 35/06 411/368 |
| 3,748,948 A | | 7/1973 | Schmitt | |
| 4,223,585 A | * | 9/1980 | Barth | ..................... F16B 35/065 411/389 |
| 4,510,898 A | * | 4/1985 | Ampferer | ............... F02B 67/04 411/389 |
| 5,312,005 A | * | 5/1994 | Odell | ...................... F16B 12/30 411/397 |

(Continued)

FOREIGN PATENT DOCUMENTS

| | | |
|---|---|---|
| CN | 1360684 A | 7/2002 |
| CN | 1693723 A | 11/2005 |

(Continued)

*Primary Examiner* — Gary W Estremsky
(74) *Attorney, Agent, or Firm* — Walter Ottesen, P.A.

(57) ABSTRACT

A work apparatus includes a housing part and a stud bolt for fastening a work tool on the housing part. The stud bolt extends along an axial direction and has a first section and a second section in the axial direction. The first section is at least in part arranged in a receptacle of the housing part. The second section protrudes from the housing part in the axial direction. The first section of the stud bolt in a first lower portion thereof has an outer thread which, for transmitting longitudinal forces (L), threadably engages an inner thread of the receptacle to define a threaded connection. The first section for transmitting transverse forces (Q) to the housing part, in a second lower portion thereof, has a support region supported on the receptacle. The support region is disposed at a spacing (a1) from the threaded connection.

21 Claims, 10 Drawing Sheets

(56) References Cited

U.S. PATENT DOCUMENTS

| | | | |
|---|---|---|---|
| 6,758,512 B2* | 7/2004 | Dobbs | B60J 5/0408 |
| | | | 411/389 |
| 7,010,831 B1 | 3/2006 | Beck et al. | |
| 7,118,317 B2 | 10/2006 | Hofschneider | |
| 7,399,150 B2 | 7/2008 | Hofschneider | |
| 8,016,534 B2* | 9/2011 | Nilsen | F16B 39/025 |
| | | | 411/362 |
| 8,920,091 B2* | 12/2014 | Heinrich | F16B 5/0275 |
| | | | 411/389 |
| 9,506,486 B2* | 11/2016 | Stieler | F16B 33/00 |
| 2005/0244249 A1 | 11/2005 | Sussenbach | |
| 2008/0213065 A1 | 9/2008 | Sussenbach | |
| 2011/0038687 A1 | 2/2011 | Babej | |
| 2011/0232110 A1* | 9/2011 | Wolf | B27B 17/02 |
| | | | 30/383 |
| 2014/0169912 A1* | 6/2014 | Sutterluetti | F16B 35/041 |
| | | | 411/389 |
| 2014/0175721 A1 | 6/2014 | Stieler | |
| 2015/0068048 A1* | 3/2015 | Yoneyama | B27B 17/02 |
| | | | 411/147 |
| 2017/0175797 A1* | 6/2017 | Kawamura | F16B 39/38 |
| 2018/0340558 A1 | 11/2018 | Lembach | |
| 2020/0116189 A1* | 4/2020 | Wagner | F16B 41/00 |

FOREIGN PATENT DOCUMENTS

| | | |
|---|---|---|
| CN | 101994737 A | 3/2011 |
| DE | 297 21 319 U1 | 2/1998 |
| DE | 20 2004 012 253 U1 | 12/2005 |
| DE | 10 2005 032 282 A1 | 3/2006 |
| DE | 20 2011 050 893 U1 | 11/2012 |
| EP | 3 409 957 A1 | 12/2018 |
| JP | H11-182522 A | 7/1999 |
| WO | 2004078434 A1 | 9/2004 |

* cited by examiner

WORK APPARATUS AND STUD BOLT FOR A WORK APPARATUS

CROSS REFERENCE TO RELATED APPLICATION

This application claims priority of European patent application no. 19 175 471.2, filed May 20, 2019, the entire content of which is incorporated herein by reference.

FIELD OF THE INVENTION

The invention relates to a work apparatus and to a stud bolt for such a work apparatus.

BACKGROUND OF THE INVENTION

A chainsaw, the guide bar thereof being fastened to stud bolts which by way of a threaded connection are connected to the housing of the chainsaw, is known from U.S. Pat. No. 9,506,486 B2. The stud bolts have in each case a detent plate as a depth stop, the detent plate projecting beyond the nominal diameter of the thread. In the operation of the chainsaw, vibrations are transmitted from the guide bar to the threaded connection. On account thereof, cracks can be created in the housing in particular when long guide bars are used.

SUMMARY OF THE INVENTION

The invention is based on the object of refining a work apparatus in such a manner that the stud bolt when in operation is held in a durable manner with little wear.

This object is achieved by a work apparatus of the invention which includes: a work tool; a housing part; a stud bolt threadably engaged in the housing part for attaching the work tool thereon; the stud bolt extending along an axial direction; the stud bolt defining a first section and a second section extending in the axial direction with the axial direction running in a direction from the first section to the second section; the housing part having a receptacle provided therein; the first section of the stud bolt being mounted at least partially in the receptacle and the second section extending upwardly in the axial direction out from the housing part; the receptacle defining an inner thread; the first section of the stud bolt having a first lower portion defining an outer thread threadably engaging the inner thread of the receptacle for transmitting longitudinal forces (L); the outer thread and the inner thread conjointly defining a threaded connection; the first section of the stud bolt having a second lower portion defining a support region for transmitting transverse forces (Q) to the housing part; the support region being braced at least indirectly on the receptacle; and, the support region being arranged in the axial direction at a distance (a1) to the threaded connection.

A further object of the invention lies in providing a stud bolt for a work apparatus. The stud bolt is capable of being fastened in a durable manner with little wear in the work apparatus.

The invention provides that the outer thread of the stud bolt is disposed in the first subsection of the first section. The first section of the stud bolt is at least in part disposed in the receptacle of the housing part of the work apparatus. The second subsection of the first section of the stud bolt for transmitting transverse forces to the housing part has a support region which is at least indirectly supported on the receptacle of the housing and in the axial direction is disposed at a spacing from the threaded connection of the outer thread of the stud bolt and the inner thread of the receptacle. The outer thread of the stud bolt and the inner thread of the receptacle in the region of the threaded connection overlap one another in terms of the axial direction.

On account thereof, the transmission of longitudinal forces from the stud bolt to the housing part takes place in a manner spatially separated from the transmission of transverse forces from the stud bolt to the housing part. Forces which act on the stud bolt in the axial direction are referred to as longitudinal forces. Forces which act on the stud bolt transversely to the axial direction are referred to as transverse forces. It has been demonstrated that the transmission of transverse forces from the stud bolt to the housing part is in particular responsible for the formation of cracks in the region of the inner thread of the housing part. On account of the spacing between the support region and the threaded connection of the outer thread of the stud bolt and the inner thread of the receptacle, lower forces are transmitted by way of the outer thread of the stud bolt. In particular, only very minor transverse forces, or no transverse forces, are transmitted from the outer thread to the inner thread. On account thereof, the inner thread of the housing part is stressed to a significantly lesser extent, and the risk of cracks forming in the housing part in the region of the inner thread is precluded or at least reduced. The transverse forces which are predominantly responsible for the formation of cracks are largely transmitted from the stud bolt to the housing part by way of the support region which is configured so as to be separate from the outer thread. On account thereof, the critical transverse forces can be absorbed in a targeted manner by a location of the housing part which is less susceptible in terms of the formation of cracks. On account thereof, the stud bolt is held in a durable manner with low wear in the receptacle of the housing part.

The support region for transmitting transverse forces to the housing part can directly contact the receptacle. In the case of such a direct support, the support region directly contacts the receptacle. In contrast, in the case of an indirect support, a component is disposed between the support region and the receptacle, the transverse forces from the support region being capable of being transmitted to the housing part by way of the component. Such a component for indirect support is in particular a deformable material for compensating tolerances, or a filler material such as an adhesive by way of which a gap between the stud bolt and the housing part can be filled after assembling the stud bolt. It can be ensured on account thereof that the supporting action transverse to the axial direction takes place at the support region and not at the outer thread, even in the case of an unfavorable position in terms of tolerances.

A thickening having a diameter which is measured perpendicularly to the axial direction is advantageously disposed in the second subsection of the first section, the diameter being larger than the nominal diameter of the outer thread of the stud bolt. The support region of the second subsection is expediently part of the thickening. The diameter of the thickening in the support region advantageously continuously increases in the axial direction. On account thereof, the transverse forces can be transmitted in a simple manner from the thickening to the housing part. Part of the longitudinal forces can be transmitted to the housing as transverse forces.

The support region of the stud bolt is in particular disposed at a spacing from the outer thread of the stud bolt.

The thickening is expediently conical at least in the support region. The support region is advantageously conical.

The thickening, at least in the support region, is in particular curved so as to be convex in the axial direction. The thickening is advantageously curved so as to be convex.

It is advantageously provided that the spacing between the support region and the threaded connection of the outer thread and the inner thread is at least 10%, in particular at least 20%, preferably at least 50%, of the nominal diameter of the outer thread of the second subsection of the stud bolt. On account thereof, a sufficient spatial separation of the support region for transmitting transverse forces and of the outer thread for transmitting longitudinal forces is guaranteed.

In an advantageous embodiment of the invention it is provided that the receptacle on the end thereof that faces the second section of the stud bolt has an opening section, and that the opening section has a contact surface for bearing on the stud bolt, the contact surface being disposed at a spacing from the inner thread of the receptacle that is measured in the axial direction. The spacing between the contact surface and the inner thread is in particular at least 5% of the nominal diameter of the outer thread.

The diameter of the opening section advantageously increases in the axial direction. It is ensured on account of this configuration that the support region can at all times be supported on the opening section, independently of any tolerances that arise.

The opening section is expediently conical. In particular, the opening section, at least in the region of the contact surface, is conical in the axial direction.

The opening section, at least in the region of the contact surface, is expediently curved so as to be convex along the axial direction. The opening section is advantageously curved so as to be convex. On account thereof, the stud bolt by way of the support region thereof can in a simple manner contact defined locations of the opening section of the receptacle.

The opening section of the receptacle in the axial direction is expediently delimited by a support surface of the housing part. The support surface can serve for bearing the stud bolt in the axial direction. The opening section of the receptacle in the axial direction is expediently delimited by an upper edge, and in the opposite direction delimited by a lower edge. At the upper edge, the receptacle advantageously has the largest diameter thereof and at the upper edge transitions in particular to the support surface. At the lower edge, the receptacle advantageously has the smallest diameter thereof, and at the lower edge transitions in particular to the first subsection. The support surface in the axial direction advantageously has a spacing from the lower edge. The support region in the axial direction advantageously has a spacing from the upper edge as well as from the lower edge. On account thereof, the stud bolt is supported between the edges, thus in a central region of the opening section in the axial direction. The introduction of force into the housing thus does not take place in a concentrated manner at one exposed edge. The upper and the lower edge of the receptacle are stressed to a lesser extent on account thereof. Damage to the housing on the support surface, or to the counter thread, respectively, can thus be avoided. Furthermore, notching of the edges of the opening section into the thickening of the stud bolt, and the wear associated therewith, can be avoided in a simple manner.

In an advantageous embodiment of the invention the second section of the stud bolt on the end thereof that faces the first section of the stud bolt has a third subsection having a collar for the work tool. The second section of the stud bolt expediently has a fourth subsection having a tensioning thread for screw-fitting a nut thereon. By screw-fitting the nut, the work tool can be tensioned in relation to the housing, in particular in relation to the support surface of the housing.

The stud bolt is expediently interchangeable. The stud bolt is in particular interchangeable from the side of the support surface.

In a particular configuration embodiment of the invention it is provided that the stud bolt is composed of a first material, in particular of steel, and that the housing part is composed of a different second material, in particular of magnesium.

It is advantageously provided that the work apparatus is a chainsaw, that the work tool is a guide bar having a saw chain, and that the stud bolt forms a guide element for the guide bar. The guide bar in the radial direction projects asymmetrically beyond the stud bolt.

The stud bolt according to the invention is conceived such that the stud bolt can be used in a work apparatus according to the invention.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
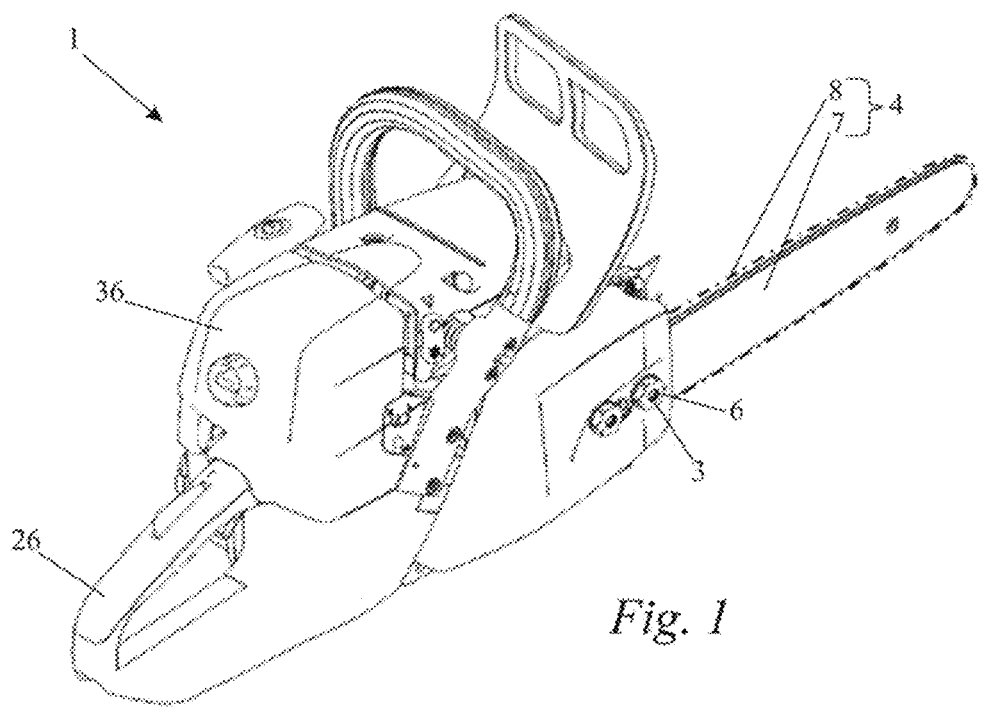
FIG. 1 shows a schematic perspective view of a chainsaw having a stud bolt and a guide bar.

FIG. 1 shows a hand-held work apparatus 1. The hand-held work apparatus 1 shown is a chainsaw. The work apparatus 1 has a handle 26 and a guide bar 7 on which a saw chain 8 is guided in a revolving manner. The handle 26 is disposed on a rear end of the housing 36 of the chainsaw. The guide bar 7 protrudes from the housing 36 on a front end of the housing 36 of the chainsaw. The guide bar 7 and the saw chain 8 conjointly form a work tool 4 of the work apparatus 1. The work tool 4 has a cutout 27, at least one stud bolt 3 protruding through the cutout 27. A fastening element 6 threadably engaged to the stud bolt 3 tensions the bar in relation to the housing 36. The fastening element 6 in the embodiment is a nut.

Figure 2:
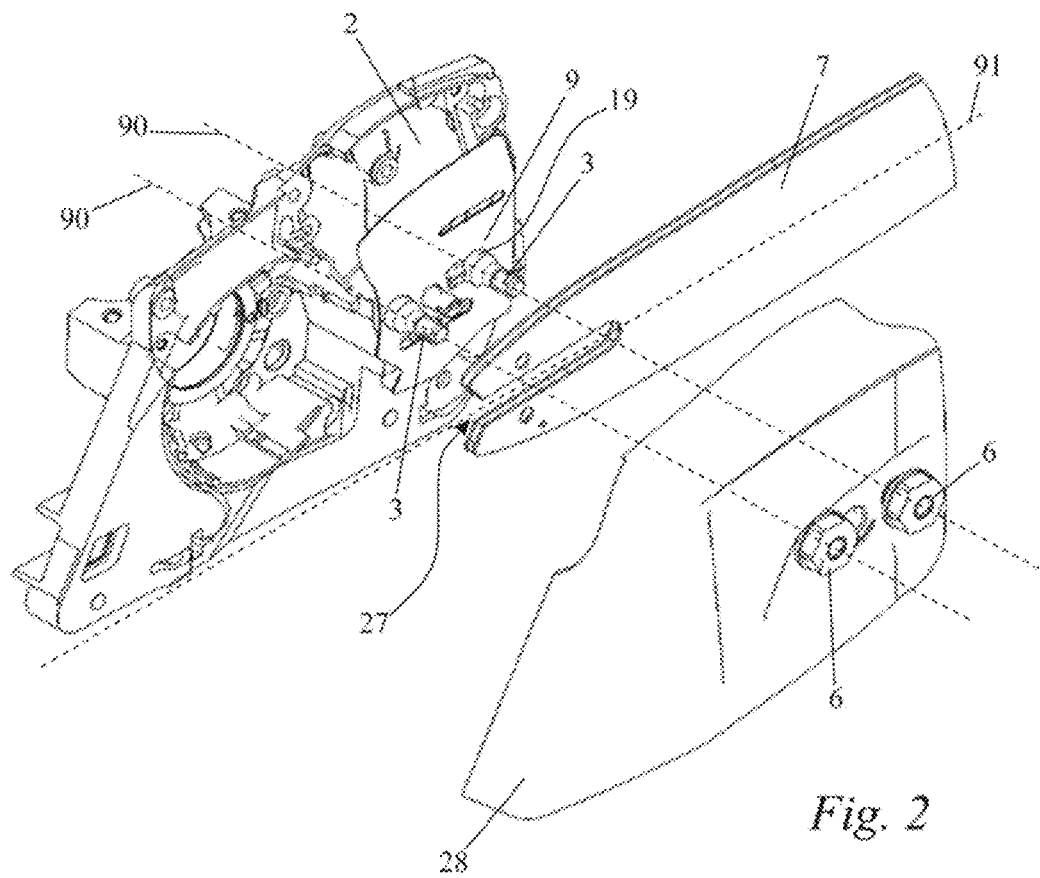
FIG. 2 shows an exploded view of the chainsaw from FIG. 1.

As shown in FIG. 2, the work apparatus 1 possesses a housing part 2 which forms part of the housing 36. A motor (not illustrated) for driving the saw chain 8 is established on the housing part 2. The housing part 2 in the embodiment is part of a motor housing on which the motor is disposed. The motor is advantageously an internal combustion engine, and the housing part 2 forms part of a crankcase of the internal combustion engine. The at least one stud bolt 3 projects from the housing part 2. Two stud bolts 3 are provided in the embodiment. The stud bolt 3 extends along a longitudinal axis 90. The stud bolt 3 is oriented so as to be perpendicular to a support surface 9 shown in FIG. 3. The support surface 9 is covered by a sprocket cover 28 in FIG. 2. The sprocket cover has an opening by way of which the sprocket cover is plug-fitted to the stud bolt 3.

The stud bolt 3 is composed of steel. The housing part 2 is advantageously at least in part composed of light metal, in particular of magnesium. It may also be provided that the housing part is composed of a plurality of different materials. The housing part 2 can in particular form part of a crankcase of an internal combustion engine of the work apparatus. For example, the opening section of the housing part can thus be disposed in a first part of the housing part, and the inner thread of the receptacle can be disposed in the second part of the housing part which delimits the crankcase, for example. The two parts of the housing part are fixedly connected, in particular press-fitted, or adhesively bonded, or welded, to one another independently of the stud bolt.

The stud bolt 3 is interchangeable. To this end, the stud bolt 3 can be screwed out of the housing part 2, in particular from the support surface 9.

The guide bar 7 at the rear end thereof has the cutout 27. The rear end of the guide bar 7 faces the handle 26. The guide bar defines a longitudinal central axis 91. The cutout 27 of the guide bar 7 is advantageously disposed so as to be symmetrical in terms of the plane defined by the longitudinal central axis 91 and the longitudinal axis 90. The cutout 27 extends along the longitudinal central axis 91. The cutout 27 in the embodiment is U-shaped and configured so as to be open towards the rear end of the guide bar 7. It may also be provided that the cutout 27 is configured as a slot.

In order for the guide bar 7 to be fastened to the housing part 2, the guide bar 7 by way of the cutout 27 thereof is plug-fitted over the two stud bolts 3. The stud bolts 3 have a collar 19 for the guide bar 7, the guide bar 7 by way of the circumference of the cutout 27 being guided on the collar 19. When the guide bar 7 is in the desired position, the stud bolts 3 are guided through bores of a sprocket cover 28 of the work apparatus 1. The sprocket cover 28 at least in part covers the U-shaped cutout 27 of the guide bar 7. The guide bar 7 is disposed between the housing part 2 and the sprocket cover 28. Nuts as fasteners 6 are screw-fitted onto the stud bolts 3 which protrude from the sprocket cover 28. The nuts press the sprocket cover 28 and the guide bar 7 against the housing part 2. The guide bar 7 is in this way fastened on the housing part 2.

Vibrations of the guide bar 7 can arise in the operation of the work apparatus 1. Forces on account of the vibrations, or else when sawing with the chainsaw, are transmitted from the guide bar 7 to the stud bolts 3 and introduced from the stud bolts 3 into the housing part 2.

Figure 3:
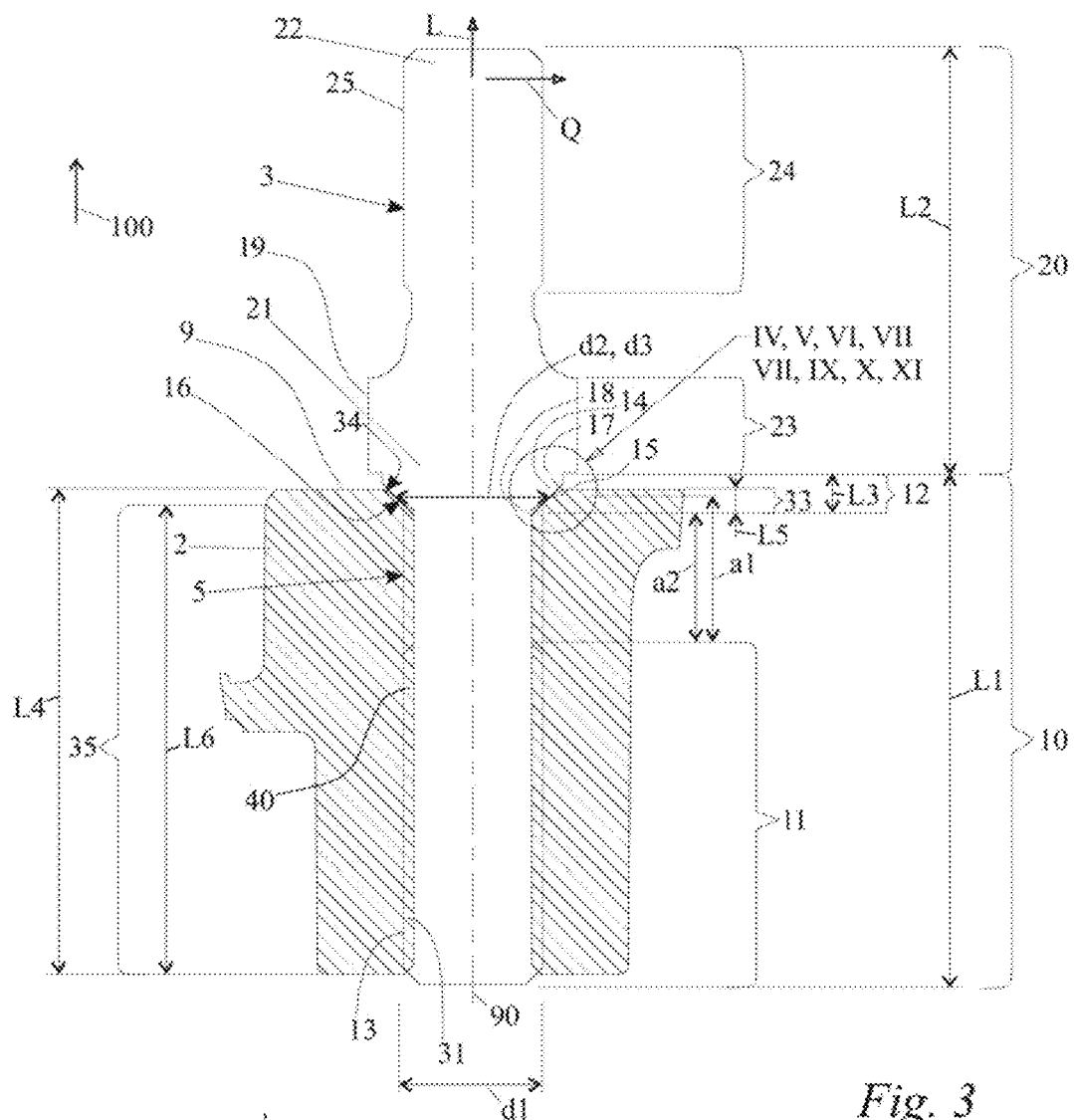
FIG. 3 shows a partially sectional illustration of a stud bolt disposed in the receptacle of a housing part.

As shown in FIG. 3, the stud bolt 3 is disposed in a receptacle 5 of the housing part 2. The stud bolt 3 extends in an axial direction 100. The axial direction 100 runs along the longitudinal axis 90. The stud bolt 3 in the axial direction 100 has a first section 10 and a second section 20. The first section 10 of the stud bolt 3 is at least in part disposed in the receptacle 5 of the housing part 2. In terms of the axial direction 100, more than 90% of the first section 10 of the stud bolt 3 is situated in the receptacle 5 of the housing part 2. The second section 20 is entirely outside the receptacle 5 of the housing part 2. The axial direction 100 runs in the direction from the first section 10 of the stud bolt 3 to the second section 20 of the stud bolt 3. The second section 20 of the stud bolt 3 protrudes from the housing part 2 in the axial direction 100.

The second section 20 of the stud bolt 3 on the end 21 thereof that faces the first section 10 of the stud bolt 3 has a third subsection 23 having the collar 19 for the work tool 4. The second section 20 of the stud bolt 3 on the free end 22 thereof has a fourth subsection 24. The third subsection 23 in terms of the axial direction 100 is disposed between the fourth subsection 24 and the first section 10 of the stud bolt 3. The fourth subsection 24 of the second section 20 has a tensioning thread 25. As a fastener 6 the nut illustrated in FIG. 2 can be screw-fitted onto the tensioning thread 25. The work tool 4 is fastened to the second section 20 of the stud bolt 3, thus to the part of the stud bolt 3 that protrudes from the housing part 2.

When fastening the guide bar 7 on the housing part 2, the guide bar 7 in terms of the axial direction 100 is disposed in the third subsection 23 of the second section 20 of the stud bolt 3. The nut which is screw-fitted onto the tensioning thread 25 in this instance presses the guide bar against the support surface 9 of the housing part 2. The guide bar 7 is in this way held on the housing part 2. The support surface 9 delimits the housing part 2. The support surface 9 in the region about the stud bolt 3 is oriented so as to be perpendicular to the longitudinal axis 90. The longitudinal axis 90 is the longitudinal axis of the stud bolt 3.

The first section 10 of the stud bolt 3 has a first subsection 11. The first section 10 of the stud bolt 3 has a second subsection 12. The first subsection 11 of the first section 10 lies so as to face away from the second section 20 of the stud bolt 3. The second subsection 12 of the first section 10 lies so as to face the second section 20 of the stud bolt 3. The second subsection 12 in terms of the axial direction 100 is disposed between the first subsection 11 and the second section 20 of the stud bolt 3. The second subsection 12 in the embodiment as per FIG. 3 in the axial direction 100 is disposed at a spacing a2 from the first subsection 11.

The first section 10 of the stud bolt 3 in the first subsection 11 has an outer thread 13. In the embodiment, the outer thread 13 in the axial direction 100 extends across the entire longitudinal extent of the first subsection 11. The outer thread 13 is disposed exclusively in the first subsection 11 of the stud bolt 3. The receptacle 5 of the housing part 2 has an inner thread 31. The first subsection 11 of the stud bolt 3 by way of the outer thread 13 thereof is screwed into the inner thread 31 of the receptacle 5 of the housing part 2. Longitudinal forces L are transmitted from the guide bar 7 by way of the outer thread 13 of the stud bolt 3 to the inner thread 31 of the receptacle 5 of the housing part 2. Longitudinal forces L are forces which act in the axial direction 100 or counter to the axial direction 100.

The first section 10 of the stud bolt 3 in the axial direction 100 extends across a length L1. The outer thread 13 of the stud bolt 3, proceeding from an end of the stud bolt 3 that faces away from the second section 20, in the axial direction 100 extends across more than half the length L1 of the first section 10 of the stud bolt 3. The outer thread 13 of the stud bolt 3 in the axial direction 100 advantageously extends across less than 90%, in particular less than 75%, of the length L1 of the first section 10 of the stud bolt 3. In this way, the longitudinal forces are introduced into the housing part 2 only far in the interior of the receptacle 5.

The second section 20 of the stud bolt 3 in the axial direction 100 has a length L2. The length L1 of the first section 10 of the stud bolt 3 is larger than the length L2 of the second section 20 of the stud bolt 3. The length L1 of the first section 10 of the stud bolt 3 is larger than two times, in particular larger than 3 times, the nominal diameter d1 of the outer thread 13 of the stud bolt 3. The first section 10 is contiguous to the second section 20. The second subsection 12 of the first section 10 in the axial direction 100 has a length L3. The length L3 of the second subsection 12 is between 2% and 20%, in the embodiment between 5% and 10%, of the length L1 of the first section 10. The length L3 of the second subsection 12 is less than 1.5 times, in particular less than 1 times, the nominal diameter d1 of the outer thread 13.

The first section 10 of the stud bolt 3 in the second subsection 12 has the support region 15 for supporting the stud bolt 3 on the receptacle 5 of the housing part 2. In the embodiment as per FIG. 3, the support region 15 for transmitting transverse forces Q to the housing part 2 bears on the receptacle 5. Transverse forces Q are forces which act in the direction transverse to the axial direction 100. The support region 15 is supported on the receptacle 5 in such a manner that transverse forces Q in the operation of the work apparatus 1 are transmitted by the support region 15 to the receptacle 5 of the housing part 2. The transmission of the transverse forces Q herein does not take place mainly by friction but in that the support region 15 of the second subsection 12 pushes against the receptacle 5 of the housing part 2 in the transverse direction. The support region 15 in the embodiments as per FIGS. 4 to 11 is supported directly on the receptacle 5. In these embodiments, the support region 15 of the stud bolt 3 contacts the receptacle 5 of the housing part 2. In the embodiments as per FIGS. 12 to 19, the support region 15 for transmitting transverse forces Q to the housing part 2 is supported indirectly on the receptacle 5. The fastened work tool 4 and the support region are free of an overlap in the axial direction 100.

In the embodiments as per FIGS. 5, 6, and 8 to 11, the support region 15 extends along a line encircling the longitudinal central axis 90. The encircling line runs on the second subsection 12 of the first section 10 of the stud bolt 3. The encircling line is circular in these embodiments. In the embodiments as per FIGS. 4, 7, and 12 to 17, the support region 15 extends along a shell surface of an imaginary circular truncated cone. In the embodiments as per FIGS. 18 and 19, the support region 15 extends along the shell surface of an imaginary cylinder. The support region 15 in all exemplary embodiments extends only on the second subsection 12 of the first section 10 of the stud bolt 3. In all exemplary embodiments, a normal onto the outer surface of the second subsection 12 in the support region 15 has a vector component in the direction radial to the longitudinal axis 90.

As is illustrated in FIG. 3, the support region 15 for transmitting transverse forces Q in the axial direction 100 is disposed at a spacing a1 from a threaded connection 40 of the outer thread 13 of the stud bolt 3 and the inner thread 31 of the receptacle 5. The spacing a1 between the support region 15 and the threaded connection 40 of the outer thread 13 and of the inner thread 31 is advantageously at least 10%, in particular at least 20%, preferably at least 50%, of the nominal diameter d1 of the outer thread 13 of the second subsection 12 of the first section 10 of the stud bolt 3. In the embodiments, the spacing a1 between the support region 15 and the threaded connection 40 of the outer thread 13 and of the inner thread 31 is at least 80% of the nominal diameter d1 of the outer thread 13. In the embodiments as per FIGS. 6, 8 to 11, and 13, the spacing a1 between the support region 15 and the threaded connection 40 of the outer thread 13 and of the inner thread 31 is larger than the spacing a2 between the first subsection 11 and the second subsection 12 of the first section 10 of the stud bolt 3. In the embodiments, the spacing between the support region 15 of the stud bolt 3 and the outer thread 13 of the stud bolt 3 corresponds to the spacing a1 between the support region 15 and the threaded connection 40 of the outer thread 13 of the stud bolt 3 and the inner thread 31 of the receptacle 5.

It may also be provided that there is no spacing between the first subsection and the second subsection. In this case, the outer thread of the first subsection extends up to the second subsection. The outer thread of the first subsection in this instance is directly contiguous to the second subsection. However, there is a spacing in the axial direction between the outer thread of the first subsection and the support region, as has been described above.

Figure 4:
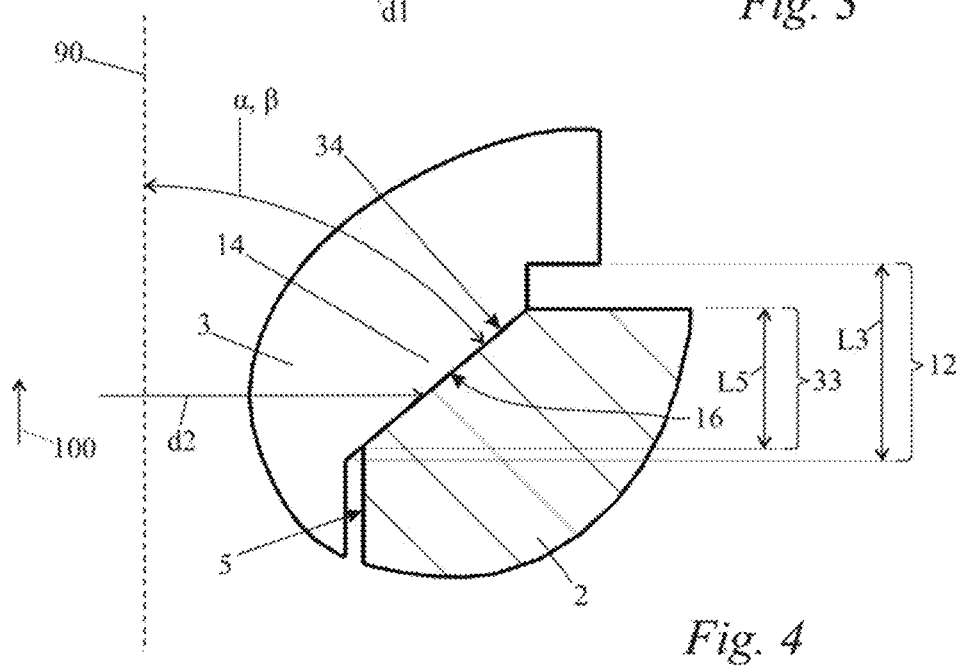
FIGS. 4 to 11 show detailed schematics of various embodiments of the stud bolt and of the housing part of FIG. 3; and, FIGS. 12 to 19 show schematics, partially in section, of various embodiments of work apparatuses having various stud bolts which are supported on housing parts of various configurations.

As is illustrated in FIG. 3, a thickening 14 of the stud bolt 3 is disposed in the second subsection 12 of the first section 10. The thickening 14 possesses a diameter d2 that is measured perpendicularly to the axial direction 100. The diameter d2 of the thickening 14 is larger than a nominal diameter d1 of the outer thread 13 of the first subsection 11 of the first section 10 of the stud bolt 3. The support region 15 is part of the thickening 14. The diameter d2 of the thickening 14 in the support region 15 advantageously continuously increases in the axial direction 100. This is illustrated in FIG. 4, for example. On account of the continuous increase of the diameter d2 of the thickening 14, the thickening 14 has in particular a conical or convex outer surface 16. On account of a shaping of the outer surface 16 of this type, a form-fitting contact between the stud bolt 3 and the receptacle 5 can be ensured even in the case of large tolerances such that the support region 15 can be reliably supported in the circumferential direction on a contact surface 34 of the receptacle 5.

In the embodiments as per FIGS. 4 to 6, 10 and 12 to 18, the thickening 14 is conical at least in the support region 15. In these embodiments, the stud bolt 3 is frustoconical in the entire second subsection 12 of the first section 10.

In the embodiments as per FIGS. 7 to 9, and 11, the thickening 14 at least in the support region 15 is curved so as to be convex along the axial direction 100.

As is illustrated in FIG. 3, the receptacle 5 on the end 32 thereof that faces the second section 20 of the stud bolt 3 possesses an opening section 33. The opening section 33 has a length L5 measured in the axial direction 100. The receptacle 5 has a length L4 measured in the axial direction 100. The length L5 of the opening section 33 is only a fraction of the length L4 of the receptacle 5. In the embodiments, the length L5 of the opening section 33 is less than 20%, in particular less than 10%, of the length L4 of the receptacle 5. A diameter d3 of the opening section 33 that is measured in the direction perpendicular to the axial direction 100 increases in the axial direction 100.

The opening section 33 in the axial direction 100 extends from a lower edge 18 of the opening section 33 to an upper edge 17 of the opening section 33. The opening section 33 of the receptacle 5 in the axial direction 100 is delimited by the upper edge 17. In a view counter to the axial direction 100, the edges 17 and 18 are circular. The diameter of the upper edge 17 is larger than the diameter of the lower edge 18. The upper edge 17 of the opening section 33 lies so as to directly neighbor the support surface 9. The opening section 33 at the upper edge 17 transitions to the support surface 9. The opening section 33 of the receptacle 5 in the axial direction 100 is delimited by the support surface 9 of the housing part 2. The opening section 33 at the lower edge 18 of the opening section 33 transitions to a thread section 35 of the receptacle 5. The opening section 33 is contiguous to the thread section 35. The inner thread 31 of the receptacle 5 is disposed in the thread section 35 of the receptacle 5. The inner thread 31 extends across the entire length L6 of the thread section 35 measured in the axial direction 100. The support region 15 in the axial direction 100 has a spacing from the upper edge 17 as well as from the lower edge 18.

When assembling the stud bolt 3 in the housing part 2, the stud bolt 3 is introduced through the opening section 33 into the receptacle 5 of the housing part 2 and is screwed into the inner thread 31. The opening section 33 in the embodiment is funnel-shaped. The opening section 33 of the receptacle 5 possesses the contact surface 34 for bearing on the stud bolt 3. In the embodiments as per FIGS. 4 to 6, 9, 12, 13, and 17 to 20, the opening section in the region of the contact surface 34 is conical in the axial direction 100. In the embodiments as per FIGS. 7 and 8, the opening section 33 in the region of the contact surface 34 is curved so as to be concave. In the embodiments as per FIGS. 10 and 11, the opening section 33 in the region of the contact surface 34 is curved so as to be convex.

Figure 8:
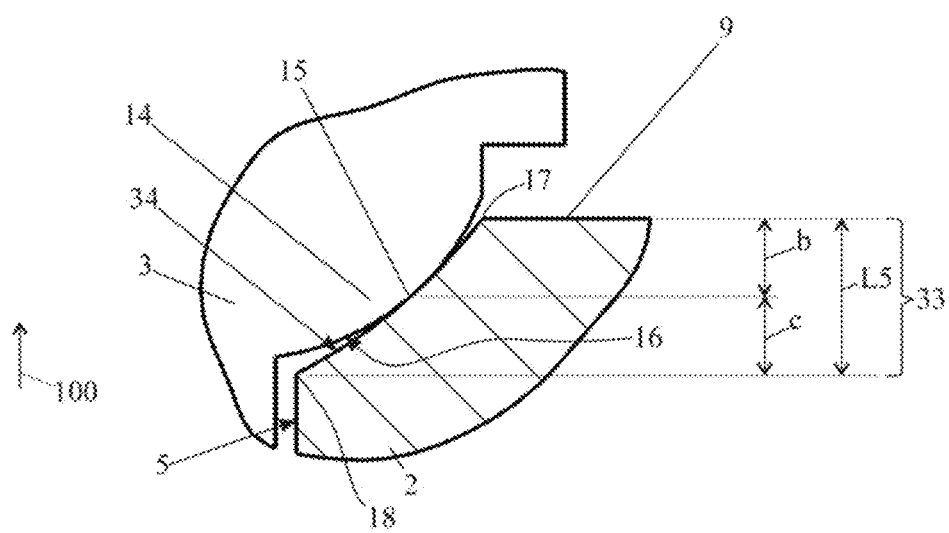

As is illustrated in FIG. 3, the thickening 14 of the stud bolt 3 possesses the outer surface 16 for bearing on the receptacle 5 of the housing part 2. As is illustrated in FIG. 8, it may be provided that the contact surface 34 of the receptacle 5 of the housing part 2 and the outer surface 16 of the thickening 14 of the stud bolt 3 are mutually adapted such that the thickening 14 of the stud bolt 3, measured in the axial direction 100, bears on the contact surface 34 of the receptacle 5 of the housing part 2 at a spacing b from the support surface 9. This is likewise the case in the embodiments as per FIGS. 9 to 11. The thickening 14 bears on the contact surface 34 of the receptacle 5 of the housing part 2 at a spacing b from the upper edge 17.

As is illustrated in FIG. 8, it may be provided that the contact surface 34 of the receptacle 5 of the housing part 2 and the outer surface 16 of the thickening 14 of the stud bolt 3 are mutually adapted such that the thickening 14 of the stud bolt 3, measured in the axial direction 100, bears on the contact surface 34 of the receptacle 5 of the housing part 2 at a spacing c from the lower edge 18 of the opening section 33. This is likewise the case in the embodiments as per FIGS. 9 to 11. In the embodiments as per FIGS. 8 to 11, the contact surface of the receptacle 5 of the housing part 2 and the outer surface 16 of the thickening 14 of the stud bolt 3 are mutually adapted such that the thickening 14 of the stud bolt 3 in the axial direction 100 bears on the contact surface 34 of the receptacle 5 of the housing part 2 only between the upper edge 17 and the lower edge 18 of the opening section 33. In other words, the support region 15 in the axial direction 100 contacts the receptacle 5 only between the upper edge 17 and the lower edge 18 of the opening section 33. The spacing b between the support surface 9 of the housing part 2 and the support region 15 is at least 5%, in particular at least 10%, preferably at least 30%, of the length L5 of the opening section 33. The spacing c between the lower edge 18 of the opening section 33 and the support region 15 is at least 5%, in particular at least 10%, preferably at least 30%, of the length L5 of the opening section 33.

As is illustrated in FIG. 3, the contact surface 34 of the opening section 33 in the axial direction 100 is disposed at a spacing b1 from the threaded connection 40 of the outer thread 13 of the stud bolt 3 and the inner thread 31 of the receptacle 5. The spacing b1 between the contact surface 34 and the threaded connection 40 of the outer thread 13 and of the inner thread 31 is at least 10%, in particular at least 20%, preferably at least 50%, of the nominal diameter d1 of the outer thread 13 of the second subsection 12 of the first section 10 of the stud bolt 3. In the embodiments, the spacing b1 between the contact surface 34 and the threaded connection 40 of the outer thread 13 and of the inner thread 31 is at least 80% of the nominal diameter d1 of the outer thread 13. In the embodiments, the spacing b1 between the contact surface 34 and the threaded connection 40 of the outer thread 13 and of the inner thread 31 corresponds to the spacing a1 between the support region 15 of the stud bolt 3 and the threaded connection 40 of the outer thread 13 and of the inner thread 31. In the embodiments, the spacing between the contact surface 34 of the opening section 33 of the receptacle 5 and the inner thread 31 of the receptacle 5 corresponds to the spacing b1 between the contact surface 34 and the threaded connection 40 of the outer thread 13 and of the inner thread 31. The spacing b1 between the contact surface 34 and the inner thread 31 is at least 5% of the nominal diameter d1 of the outer thread 13.

FIG. 4 shows an embodiment of a stud bolt 3 having a conical thickening 14. The opening section 33 in the embodiment as per FIG. 4 is likewise conical. The contact surface 34 of the opening section 33 extends across the entire length L5 of the opening section 33. The outer surface 16 of the thickening 14 bears on the contact surface 34 of the opening section 33 across the entire length L5 of the opening section 33. Depending on the position of the production tolerances, the outer surface 16 may also bear on the opening section 33 only in a region of the opening section 33. The conical contact surface 34 of the thickening 14 extends across more than two thirds of the length L3 of the second subsection 12 of the first section 10 of the stud bolt 3. It may also be provided that the conical contact surface 34 of the thickening 14 extends across the entire length L3 of the second subsection 12 of the first section 10 of the stud bolt 3.

In the embodiment, the thickening 14 has a spacing from the outer thread 13 which corresponds to the spacing a2 illustrated in FIG. 3 between the support region 15 and the threaded connection 40 of the outer thread 13 and the inner thread 31. The spacing between the outer thread 13 and the thickening 14 is at least 10%, in particular at least 20%, preferably at least 50%, of the nominal diameter d1 of the outer thread 13 of the second subsection 12 of the first section 10 of the stud bolt 3.

It can also be provided that there is no spacing between the thickening and the outer thread. In this case, the outer thread of the first subsection extends up to the thickening. The outer thread of the first subsection in this instance is directly contiguous to the thickening.

In the embodiments as per FIGS. 3 to 6 and 12 to 17 the outer surface 16 of the conical thickening 14 conjointly with the longitudinal axis 90 encloses an angle α. The angle α is 20° to 70°, in particular 30° to 60°. The angle α opens in the axial direction 100.

In the embodiments as per FIGS. 3 to 6 and 12 to 17 the contact surface 34 of the conical opening section 33 conjointly with the longitudinal axis 90 encloses an angle β. The angle β is 20° to 70°, in particular 30° to 60°. The angle β opens in the axial direction 100. In the embodiment as per FIG. 4, the angle α between the outer surface 16 and the longitudinal axis 90 and the angle β between the contact surface 34 and the longitudinal axis 90 are of identical size.

Figure 5:
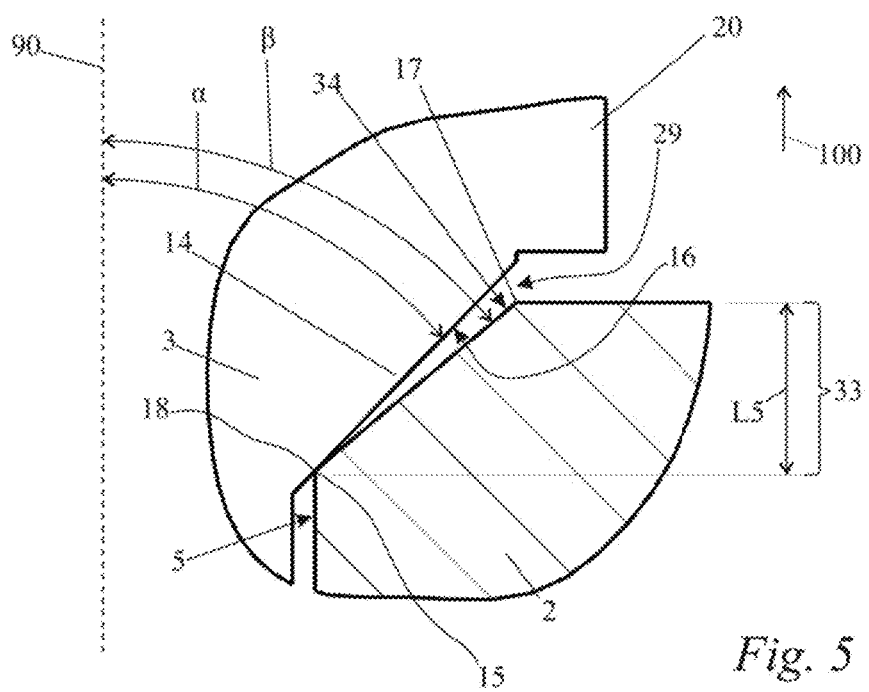

FIG. 5 shows an embodiment having a stud bolt 3 having a conical thickening 14 and having a receptacle 5 having a conical opening section 33. The angle β between the contact surface 34 of the opening section 33 and the longitudinal axis 90 in the embodiment as per FIG. 5 is larger than the angle α between the outer surface 16 of the thickening 14 and the longitudinal axis 90. The outer surface 16 of the thickening 14 bears on the lower edge 18 of the opening section 33. The support region 15 bears on the lower edge 18 of the opening section 33. A gap 29 is configured between the outer surface 16 of the thickening 14 and the contact surface 34 of the opening section 33. The gap 29, proceeding from the support region 15, extends in the direction toward the second section 20 of the stud bolt 3.

Figure 6:
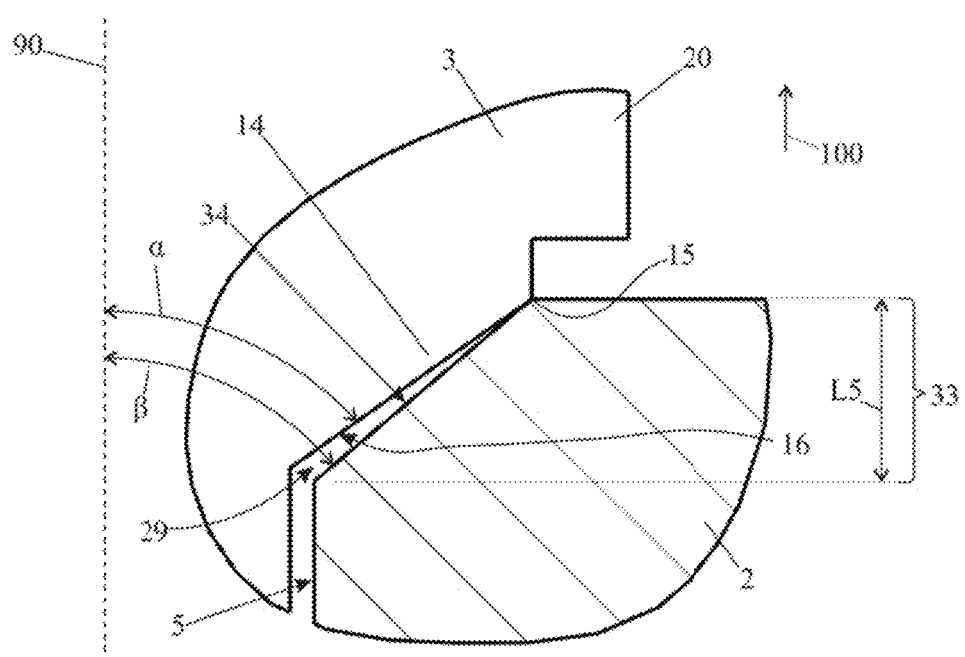

FIG. 6 shows an embodiment of the work apparatus 1 having a stud bolt 3 having a conical thickening 14 and having a receptacle 5 having a conical opening section 33. In the embodiment as per FIG. 6, the angle α between the outer surface 16 of the thickening 14 and the longitudinal axis 90 is larger than the angle β between the contact surface 34 of the opening section 33 and the longitudinal axis 90. The outer surface 16 of the thickening 14 bears on the upper edge 17 of the opening section 33. The support region 15 bears on the upper edge 17 of the opening section 33. A gap 29 is configured between the contact surface 34 of the opening section 33 and the outer surface 16 of the thickening 14. The gap 29, proceeding from the upper edge 17 of the opening section 33, extends in the direction away from the second section 20 of the stud bolt 3. A desired position of the support region 15 can be ensured by suitably adapting the angles α and β.

Figure 7:
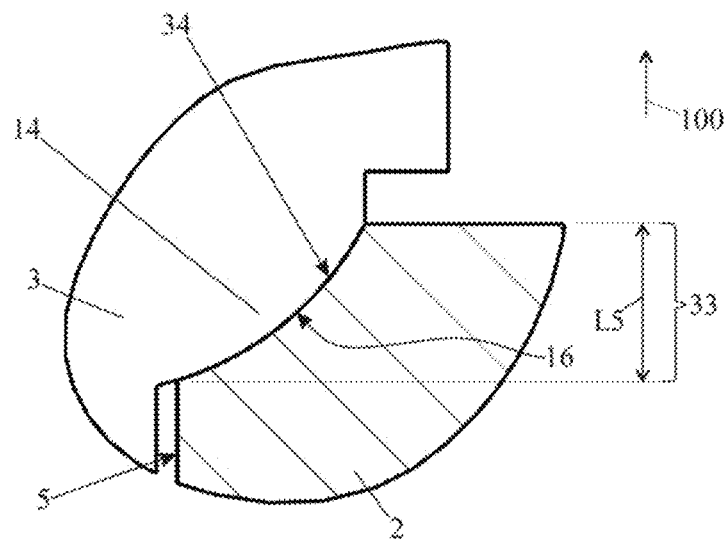

FIG. 7 shows an embodiment of the work apparatus 1 having a stud bolt 3 having a convex thickening 14 and having a receptacle 5 having a concave opening section 33. The outer surface 16 of the thickening 14 bears on the convex contact surface 34 of the opening section 33 across the entire length L5 of the opening section 33. The curvature radius of the outer surface 16 of the thickening 14 corresponds to the curvature radius of the contact surface 34 of the opening section 33. Depending on the position in terms of the tolerances, a bearing action may also be provided in one or two regions of the opening section 33.

FIG. 8 shows an embodiment having a stud bolt 3 having a convex thickening 14 and having a receptacle 5 having a concave opening section 33. The curvature radius of the convex outer surface 16 of the thickening 14 is smaller than the curvature radius of the concave contact surface 34 of the opening section 33.

Figure 9:
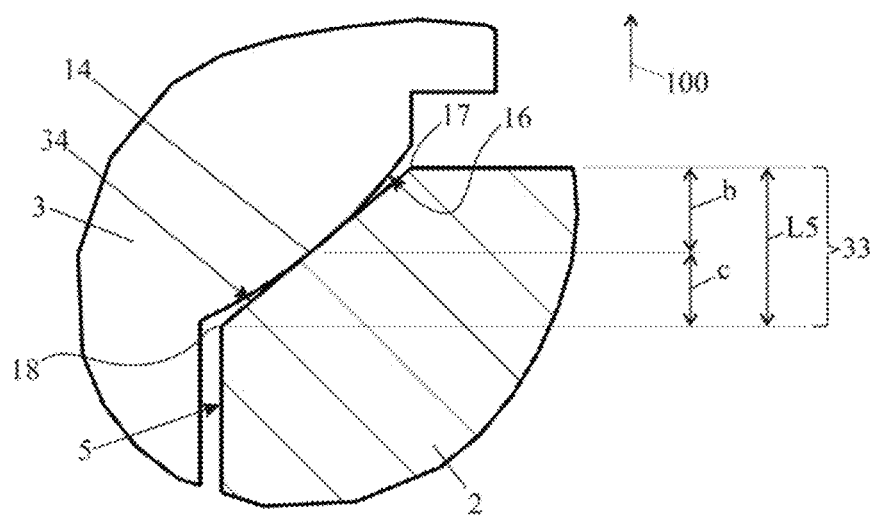

FIG. 9 shows an embodiment having a stud bolt 3 having a convex thickening 14 and having a receptacle 5 having a conical opening section 33. The outer surface 16 of the thickening 14 in the axial direction 100 bears on the contact surface 34 of the opening section 33 between the upper edge 17 and the lower edge 18 of the opening section 33.

Figure 10:
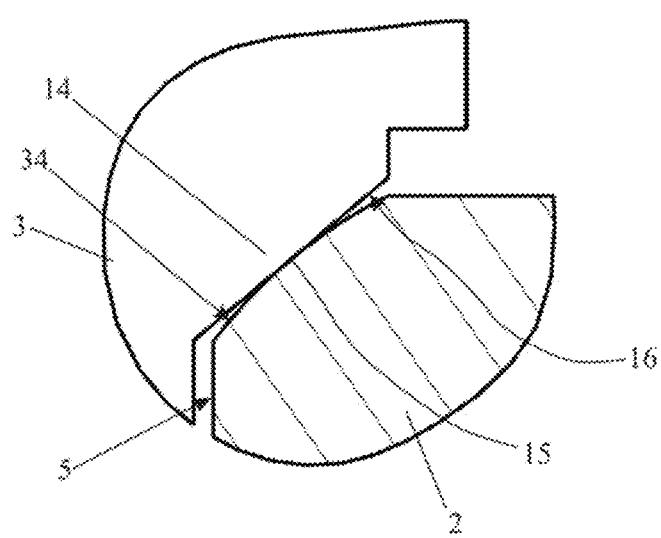

FIG. 10 shows an embodiment having a stud bolt 3 having a conical thickening 14 and having a receptacle 5 having a convex opening section 33.

Figure 11:
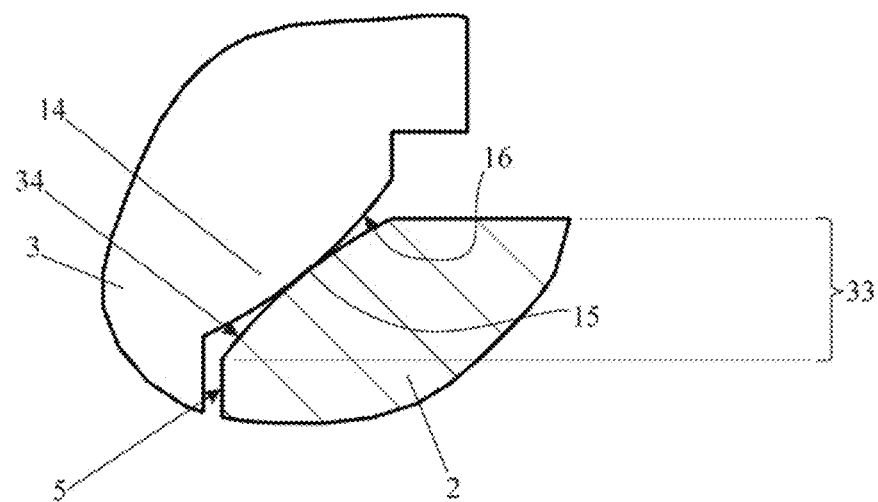

FIG. 11 shows an embodiment having a stud bolt 3 having a convex thickening and having a receptacle 5 having a convex opening section 33. In the embodiments as per FIGS. 8 to 11, the support region 15 bears between the upper edge 17 and the lower edge 18 of the opening section 33.

Figure 12:
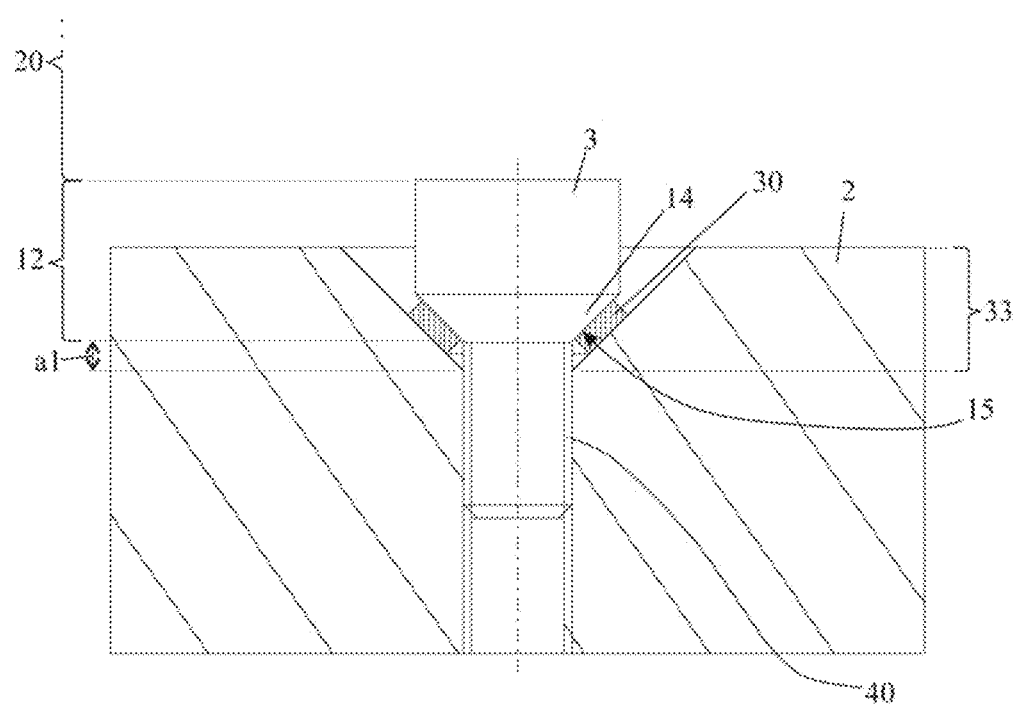

FIG. 12 shows an embodiment of the work apparatus 1 having a stud bolt 3 in which a compensation element 30 is disposed between the stud bolt 3 and the housing part 2. The compensation element 30 bears on the support region 15 of the second subsection 12 of the first section 10. The support region 15 of the stud bolt 3 for transmitting transverse forces Q is indirectly supported on the receptacle 5 by way of the compensation element 30. The compensation element 30 is elastic. It may also be provided that the compensation element is composed of a non-elastic solid material. The compensation element 30 is composed of an elastomer, for example. It may be provided that the compensation element 30 is an adhesive. This applies to all of the embodiments. On account thereof, the stud bolt 3 can first be screwed into the housing part 2. The adhesive is then incorporated into the gap between the opening section 33 of the housing part 2 and the stud bolt 3. After the adhesive has dried, transverse forces Q in the operation of the work apparatus 1 are transmitted from the stud bolt 3 to the housing part 2 by way of the adhesive.

In the embodiment as per FIG. 12 the opening section 33 is conical. The compensation element 30 possesses a conical outer surface, a conical inner surface, and an at least approximately consistent thickness. The second subsection 12 of the first section 10 of the stud bolt 3 is at least partially conical. Transverse forces Q are introduced indirectly into the conical contact surface 34 of the receptacle 5 by way of the compensation element 30. It may be provided that part of the section which in FIG. 12 is identified as the second subsection 12 already forms part of the third subsection 23 of the second section 20 of the stud bolt 3 and comprises the collar 19.

The fourth subsection is not illustrated in FIGS. 12 to 19 but is configured in a manner analogous to the preceding embodiments.

Figure 13:
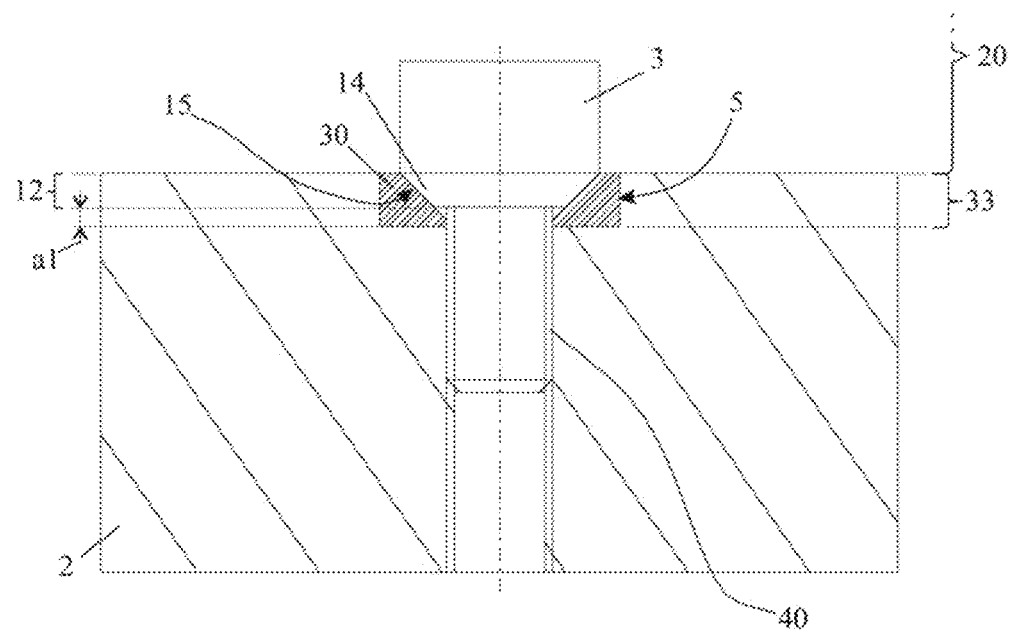

In the embodiment as per FIG. 13 the opening section 33 is cylindrical. The second subsection 12 of the first section 10 of the stud bolt 3 is conical. The compensation element 30 as per FIG. 13 fills the entire intermediate space between the stud bolt 3 and the receptacle 5 in the region of the opening section 33. Transverse forces Q are introduced indirectly into the cylindrical circumferential wall of the receptacle 5 by way of the compensation element 30.

Figure 14:
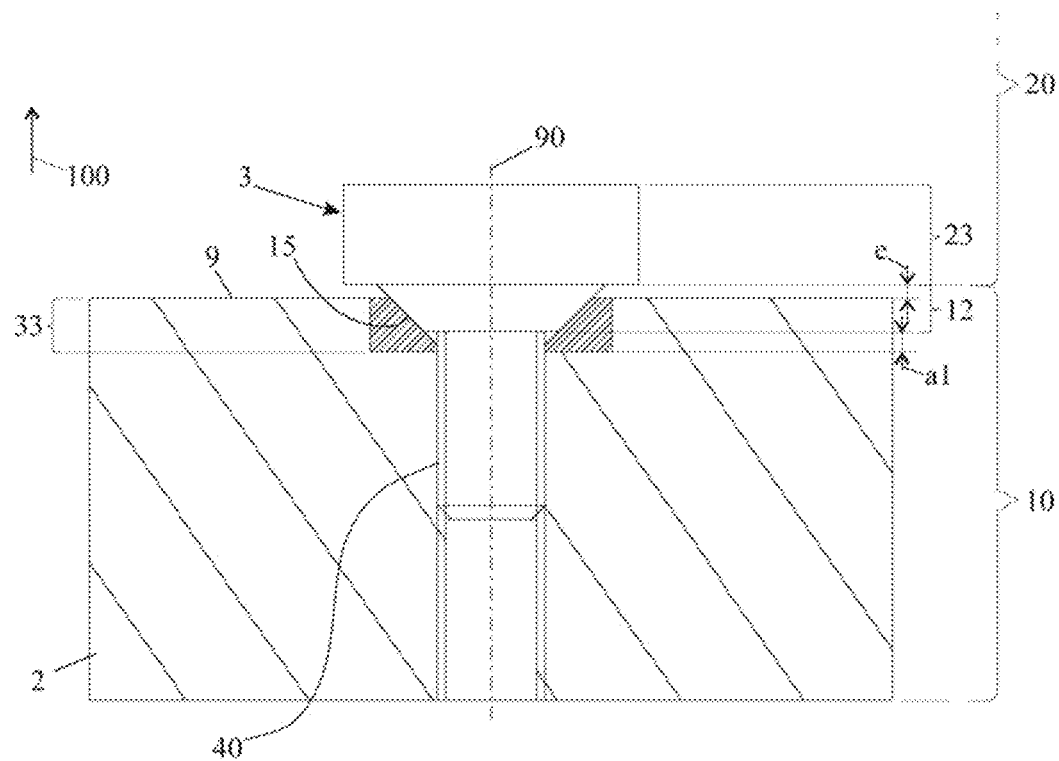
Figure 15:
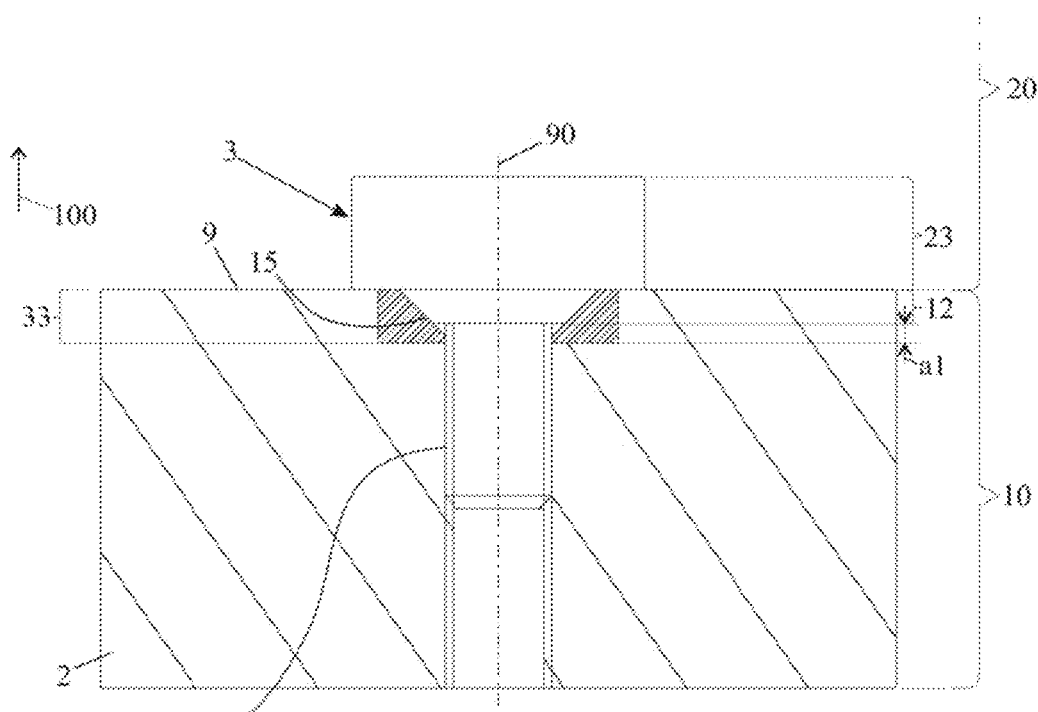

In the embodiments as per FIGS. 14 and 15 the opening section 33 is cylindrical. The second subsection 12 of the first section 10 of the stud bolt 3 is conical. The compensation element 30 as per FIGS. 14 and 15 fills the entire intermediate space between the stud bolt 3 and the receptacle 5 in the region of the opening section 33. The third subsection 23 of the second section 20 of the stud bolt 3 in the direction perpendicular to the axial direction 100 protrudes beyond the second subsection 12 of the first section 10. The stud bolts 3 in FIGS. 14 and 15 are in each case screwed into the housing part 2 as far as possible. The support region 15 herein forms a detent in the direction counter to the axial direction 100. In the embodiment as per FIG. 14 the third subsection 23 is disposed at a spacing e from the support surface 9 of the housing part 2 that is measured in the axial direction 100. In the embodiment as per FIG. 15 the third subsection 23 bears on the support surface 9 of the housing part 2. There is no spacing between the third subsection 23 and the support surface 9. The third subsection 23 forms an end detent which suppresses any further screwing-in action and herein any potential compression of the compensation element 30.

Figure 16:
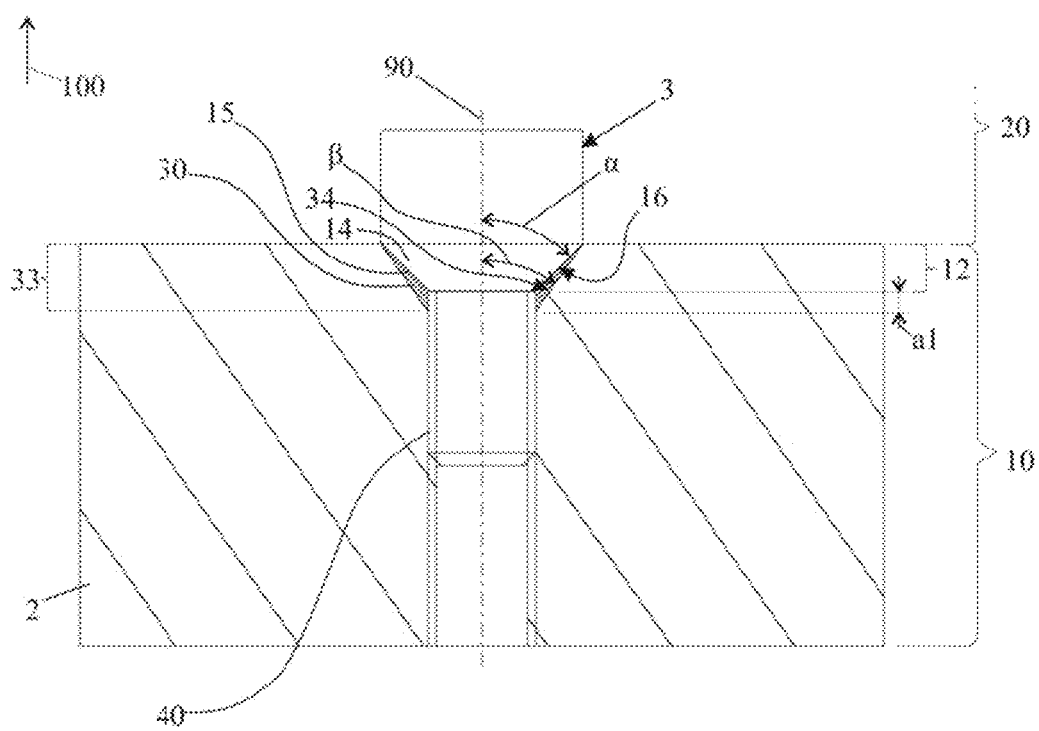
Figure 17:
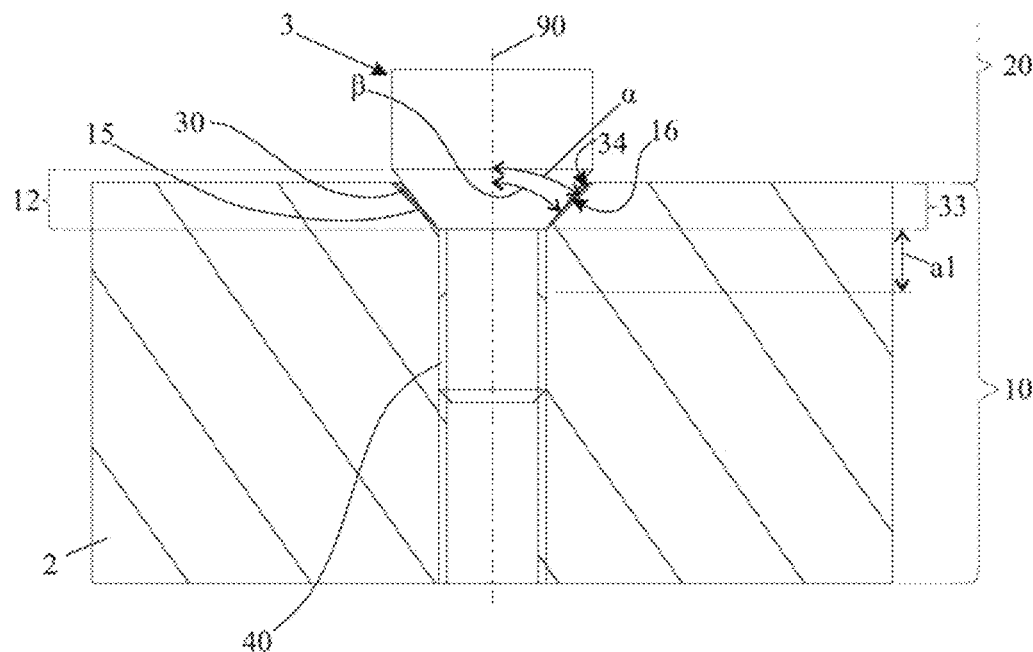

In the embodiments as per FIGS. 16 and 17 the opening section 33 is conical. The second subsection 12 of the first section 10 of the stud bolt 3 is conical. The compensation element 30 as per FIGS. 16 and 17 fills the entire intermediate space between the stud bolt 3 and the receptacle 5 in the region of the opening section 33.

The embodiment as per FIG. 16, with the exception of the compensation element 30, corresponds to the embodiment as per FIG. 6. With the exception of the description relating to the gap 29, the description pertaining to FIG. 6 can be applied in analogous manner to the embodiment as per FIG. 16. In the embodiment as per FIG. 16, the angle α between the outer surface 16 of the thickening 14 and the longitudinal axis 90 is larger than the angle β between the contact surface 34 of the opening section 33 and the longitudinal axis 90.

The embodiment as per FIG. 17, with the exception of the compensation element 30, corresponds to the embodiment as per FIG. 5. With the exception of the description relating to the gap 29, reference is made to the description pertaining to FIG. 5. In the embodiment as per FIG. 17, the angle β between the contact surface 34 of the opening section 33 and the longitudinal axis 90 is larger than the angle α between the outer surface 16 of the thickening 14 and the longitudinal axis 90.

The differences in terms of the angles in the embodiment as per FIG. 16 as well as in the embodiment as per FIG. 17 are equalized by the compensation element 30. The compensation element 30 in both embodiments is made from plastics material, in particular from an adhesive. Transverse forces Q are transmitted from the stud bolt 3 to the housing 2 by way of the adhesive.

Figure 18:
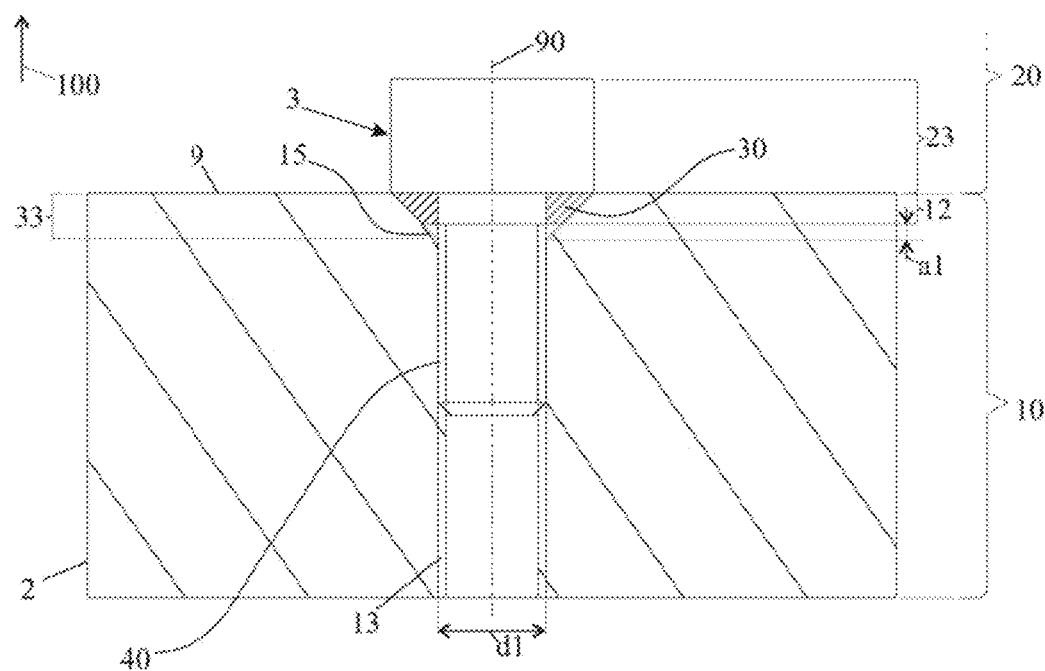
Figure 19:
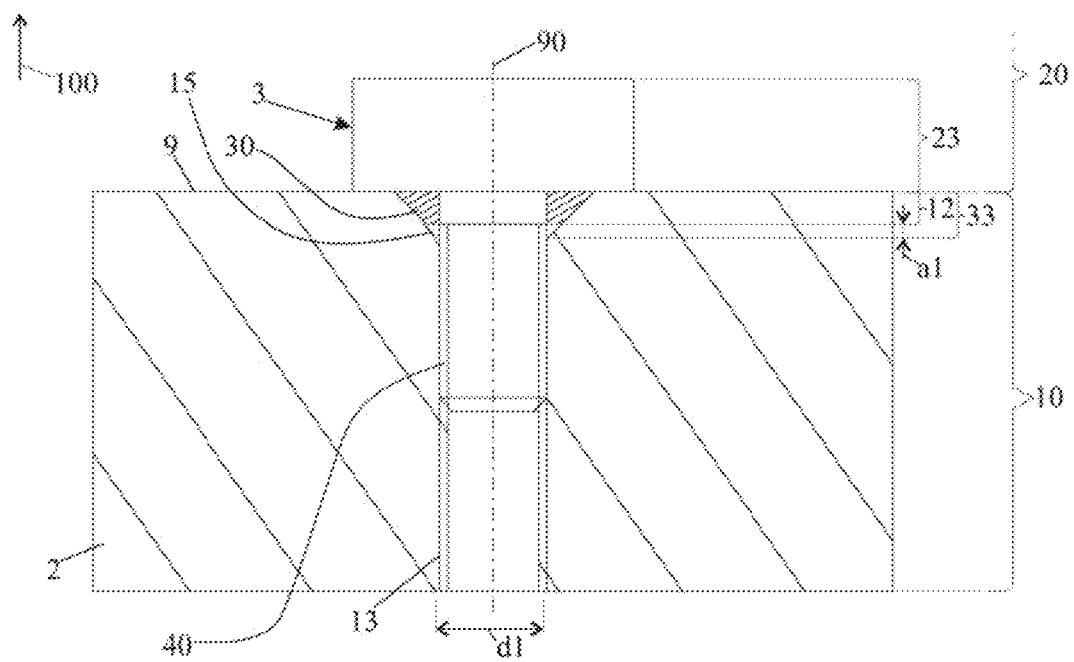

In the embodiments as per FIGS. 18 and 19 the opening section 33 is conical. The second subsection 12 of the first section 10 of the stud bolt 3 is cylindrical. The second subsection 12 in the direction perpendicular to the axial direction 100 expediently does not project beyond the nominal diameter d1 of the outer thread 13 of the first subsection 11 of the first section 10 of the stud bolt 3. When the stud bolt 3 is being screwed in, the lower side of the third subsection 23 of the stud bolt 3 moves closer to the receptacle 5 such that the compensation element 30 is increasingly compressed therebetween and on account therefore is radially preloaded toward the stud bolt 3 and the receptacle 5. The compensation element 30 as per FIGS. 18 and 19 fills only part of the intermediate space between the stud bolt 3 and the receptacle 5 in the region of the opening section 33. A part of the intermediate space that faces away from the third subsection 23 of the stud bolt 3 remains vacant.

In the embodiment as per FIG. 18 the third subsection 23 of the second section 20 of the stud bolt 3 bears only on the compensation element 30. The third subsection 23 of the second section 20 of the stud bolt 3 in the direction perpendicular to the axial direction 100 does not project beyond the compensation element 30.

In the embodiment as per FIG. 19, the third subsection 23 of the second section 20 of the stud bolt 3 in the direction perpendicular to the axial direction 100 projects beyond the compensation element 30. The third subsection 23 of the second section 20 of the stud bolt 3 bears on the support surface 9 of the housing part 2. The third subsection 23 may form an end detent which suppresses any further screwing-in action and thus any further compression of the compensation element 30.

Further advantageous embodiments are derived by arbitrary combinations of the features of the aforementioned embodiments.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
a work tool;
a housing part;
a stud bolt threadably engaged in said housing part for attaching said work tool thereon;
said work apparatus being a motor-driven chainsaw;
said work tool being a guide bar with a saw chain arranged thereon;
said stud bolt defining a guide element for said guide bar;
said stud bolt extending along an axial direction;
said stud bolt defining a first section and a second section extending in said axial direction with said axial direction running in a direction from said first section to said second section;
said housing part having a receptacle provided therein;
said first section of said stud bolt being mounted at least partially in said receptacle and said second section extending upwardly in said axial direction out from said housing part;
said receptacle defining an inner thread;
said first section of said stud bolt having a first subsection defining an outer thread threadably engaging said inner thread of said receptacle for transmitting longitudinal forces (L);
said outer thread and said inner thread conjointly defining a threaded connection;
said first section of said stud bolt having a second subsection defining a support region for transmitting transverse forces (Q) to said housing part;
said support region being braced at least indirectly on said receptacle;
said support region being arranged in said axial direction at a distance (a1) to said threaded connection; and,
wherein said distance (a1) between said threaded connection and said support region is at least 50% of a nominal diameter (d1) of said outer thread of said second subsection.

2. The work apparatus of claim 1, wherein said support region of said stud bolt is disposed at a distance to said outer thread of said stud bolt.

3. The work apparatus of claim 1, further comprising a thickening arranged in said second subsection of said first section with said thickening having a diameter (d2) measured perpendicularly to said axial direction; said diameter (d2) being greater than a nominal diameter (d1) of said outer thread; and, said support region being part of said thickening.

4. The work apparatus of claim 3, wherein said thickening is conical.

5. The work apparatus of claim 3, wherein said thickening is convexly curved.

6. The work apparatus of claim 1, wherein said receptacle has an end facing toward said second section of said stud bolt; said receptacle has an opening section at said end; said opening section has a bearing surface for bearing against said stud bolt; said bearing surface is arranged at a distance (b1) to said inner thread of said receptacle; and, said distance (b1) is measured in said axial direction.

7. The work apparatus of claim 6, wherein said distance (b1) between said bearing surface and said inner thread is at least 5% of a nominal diameter (d1) of said outer thread.

8. The work apparatus of claim 6, wherein said opening section has a diameter (d3) which increases in said axial direction.

9. The work apparatus of claim 6, wherein said opening section is conical.

10. The work apparatus of claim 6, wherein said opening section of said receptacle is convexly curved.

11. The work apparatus of claim 6, wherein said opening section of said receptacle, in said axial direction, is delimited by an upper edge and said opening section, in a direction opposite to said axial direction, is delimited by a lower edge; and, said support region, in said axial direction, is spaced from said upper edge and from said lower edge.

12. The work apparatus of claim 1, wherein said second section of said stud bolt has an end facing toward said first section of said stud bolt; and, said second section has a third subsection at said end thereof and said third subsection has a collar for said work tool.

13. The work apparatus of claim 1, wherein said second section of said stud bolt has a fourth subsection having a tensioning thread for threadably engaging a nut.

14. The work apparatus of claim 1, wherein said stud bolt is exchangeable.

15. The work apparatus of claim 1, wherein said stud bolt is made of a first material and said housing part is made of a second material different from said first material.

16. The work apparatus of claim 15, wherein said first material is steel and said second material is magnesium.

17. A work apparatus comprising:
   a work tool;
   a housing part;
   a stud bolt threadably engaged in said housing part for attaching said work tool thereon;
   said work apparatus being a motor-driven chainsaw;
   said work tool being a guide bar with a saw chain arranged thereon;
   said stud bolt defining a guide element for said guide bar;
   said stud bolt extending along an axial direction;
   said stud bolt defining a first section and a second section extending in said axial direction with said axial direction running in a direction from said first section to said second section;
   said housing part having a receptacle provided therein;
   said first section of said stud bolt being mounted at least partially in said receptacle and said second section extending upwardly in said axial direction out from said housing part;
   said receptacle defining an inner thread;
   said first section of said stud bolt having a first subsection defining an outer thread threadably engaging said inner thread of said receptacle for transmitting longitudinal forces (L);
   said outer thread and said inner thread conjointly defining a threaded connection;
   said first section of said stud bolt having a second subsection defining a support region for transmitting transverse forces (Q) to said housing part;
   said support region being braced at least indirectly on said receptacle;
   said support region being arranged in said axial direction at a distance (a1) to said threaded connection;
   a thickening arranged in said second subsection of said first section with said thickening having a diameter (d2) measured perpendicularly to said axial direction;
   said diameter (d2) being greater than a nominal diameter (d1) of said outer thread; and, said support region being part of said thickening; and,
   wherein said diameter (d2) of said thickening in said support region continuously increases in said axial direction.

18. The work apparatus of claim 17, wherein said distance (a1) between said threaded connection and said support region is at least 10% of a nominal diameter (d1) of said outer thread of said second subsection.

19. The work apparatus of claim 17, wherein said distance (a1) between said threaded connection and said support region is at least 20% of a nominal diameter (d1) of said outer thread of said second subsection.

20. The work apparatus of claim 17, wherein said distance (a1) between said threaded connection and said support region is at least 50% of a nominal diameter (d1) of said outer thread of said second subsection.

21. A stud bolt and a housing part for use as part of a work apparatus which is a motor-driven chain saw, the stud bolt threadably engaging the housing part for attaching a work tool which is a guide bar with a saw chain arranged thereon, wherein the stud bolt defines a guide element for the guide bar, the stud bolt extending along an axial direction and comprising:
   a first section and a second section extending in said axial direction with said axial direction running in a direction from said first section to said second section;
   said housing part having a receptacle provided therein;
   said first section of said stud bolt being mounted at least partially in said receptacle and said second section extending upwardly in said axial direction out from said housing part;
   said receptacle defining an inner thread;
   said first section of said stud bolt having a first subsection defining an outer thread threadably engaging said inner thread of said receptacle for transmitting longitudinal forces (L);
   said outer thread and said inner thread conjointly defining a threaded connection;
   said first section of said stud bolt having a second subsection defining a support region for transmitting transverse forces (Q) to said housing part and for providing at least indirect support on said receptacle;
   said stud bolt being so configured that when establishing said threaded connection, said support region is arranged in said axial direction at a distance (a1) to said threaded connection; and,
   wherein said distance (a1) between said threaded connection and said support region is at least 50% of a nominal diameter (d1) of said outer thread of said second subsection.

* * * * *